United States Patent
Oshima et al.

(10) Patent No.: US 9,865,858 B2
(45) Date of Patent: Jan. 9, 2018

(54) LITHIUM ION SECONDARY BATTERY (71) Applicant: Automotive Energy Supply Corporation, Zama-shi, Kanagawa (JP)

(72) Inventors: Tsutomu Oshima, Zama (JP); Shinichiro Sakaguchi, Zama (JP)

(73) Assignee: AUTOMOTIVE ENERGY SUPPLY CORPORATION, Zama-Shi, Kanagawa (JP)

( * ) Notice: Subject to any disclaimer, the term of this patent is extended or adjusted under 35 U.S.C. 154(b) by 16 days.

(21) Appl. No.: 14/967,866

(22) Filed: Dec. 14, 2015

(65) Prior Publication Data

US 2016/0190540 A1 Jun. 30, 2016

(30) Foreign Application Priority Data

Dec. 26, 2014 (JP) .................................. 2014-266087

(51) Int. Cl.
*H01M 2/18* (2006.01)
*H01M 4/13* (2010.01)
*H01M 10/0525* (2010.01)
*H01M 10/0585* (2010.01)
*H01M 4/04* (2006.01)

(52) U.S. Cl.
CPC ............... *H01M 2/18* (2013.01); *H01M 4/13* (2013.01); *H01M 10/0525* (2013.01); *H01M 10/0585* (2013.01); *H01M 4/0404* (2013.01)

(58) Field of Classification Search
None
See application file for complete search history.

(56) References Cited

U.S. PATENT DOCUMENTS

2009/0176159 A1\* 7/2009 Zhamu .................. H01M 4/483
429/222
2015/0017523 A1 1/2015 Hirai et al.

FOREIGN PATENT DOCUMENTS

| EP | 2860798 A1 | 4/2015 |
| JP | 2006-147392 A | 6/2006 |
| WO | 2013/187172 A1 | 12/2013 |

OTHER PUBLICATIONS

Extended European Search Report issued on Apr. 29, 2016 for the corresponding European Patent Application No. 15200029.5.

\* cited by examiner

*Primary Examiner* — Barbara Gilliam
*Assistant Examiner* — Wyatt McConnell
(74) *Attorney, Agent, or Firm* — Troutman Sanders LLP (57) ABSTRACT

A lithium ion secondary battery according to an embodiment of this disclosure includes: a positive electrode mixture layer provided on a main plane of a positive electrode current collector; a negative electrode mixture layer provided on a main plane of a negative electrode current collector; and an insulator covering a region of a part of a surface of a gradually-decreasing portion included in the positive electrode mixture layer. The portion has thickness gradually decreasing toward a terminal of the positive electrode mixture layer; the surface of the portion has a tangent line in contact with the surface in at least two contact points, and has a depressed part between any adjacent two contact points on the tangent line; and an end of the insulator is positioned between the contact points closest to and farthest from the terminal of the positive electrode mixture layer along the tangent line.

9 Claims, 5 Drawing Sheets

LITHIUM ION SECONDARY BATTERY

CROSS-REFERENCE TO RELATED APPLICATION

This application claims priority from Japanese Patent Application No. 2014-266087 filed with the Japan Patent Office on Dec. 26, 2014, the entire content of which is hereby incorporated by reference.

BACKGROUND

1. Technical Field

The present disclosure relates to a lithium ion secondary battery.

2. Related Art

To prevent the short-circuiting between a positive electrode and a negative electrode of a lithium ion secondary battery, a technique of providing a tape with an insulating property (hereinafter referred to as "insulating tape") at a part of the positive electrode and/or the negative electrode has been known. For example, JP-A-2006-147392 discloses a lithium ion secondary battery configured such that an insulating tape covers a part of a main plane of a positive electrode current collector included in a positive electrode and a part of a surface of an end of a positive electrode mixture layer included in the positive electrode.

SUMMARY

A lithium ion secondary battery according to an embodiment of the disclosure includes: a positive electrode mixture layer provided on a main plane of a positive electrode current collector and including a positive electrode active material intercalating or deintercalating lithium ions; a negative electrode mixture layer provided on a main plane of a negative electrode current collector and including a negative electrode active material intercalating or deintercalating lithium ions; an electrolyte layer provided between the positive electrode mixture layer and the negative electrode mixture layer; and an insulator covering a region ranging from a part of the main plane of the positive electrode current collector, the part being not provided with the positive electrode mixture layer, to a part of a surface of a gradually-decreasing portion included in the positive electrode mixture layer. The gradually-decreasing portion has thickness gradually decreasing toward a terminal of the positive electrode mixture layer; the surface of the gradually-decreasing portion has a tangent line that is in contact with the surface in at least two contact points, and has a depressed part between any adjacent two contact points on the tangent line; and an end of the insulator is positioned between the contact point that is closest to the terminal of the positive electrode mixture layer and the contact point farthest from the terminal of the positive electrode mixture layer along the tangent line.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the first charging of the lithium ion secondary battery with the configuration disclosed in JP-A-2006-147392, when lithium ions are deintercalated from the positive electrode mixture layer, lithium ions included in a region below the covered surface join lithium ions included in a region below the uncovered surface. The "covered surface" refers to a part of the surface of a later-described gradually-decreasing portion of the positive electrode mixture layer, the part being covered with the insulating tape. The "uncovered surface" refers to a part of the surface of the gradually-decreased portion, the part being not covered with the insulating tape. The "gradually-decreased portion" refers to a terminal portion of the positive electrode mixture layer whose thickness gradually decreases toward the terminal of the positive electrode mixture layer. For this reason, the flow of lithium ions concentrates in the region below the uncovered surface. As a result, not only the lithium ions included in the region below the uncovered surface but also the lithium ions included in the region below the covered surface are deintercalated from the uncovered surface.

In the conventional configuration as disclosed in JP-A-2006-147392, however, the negative electrode mixture layer opposite to the positive electrode mixture layer is not designed to enable the intercalation of all the lithium ions included in the region below the uncovered surface and the lithium ions included in the region below the covered surface. Therefore, in some cases, the lithium ions that are not intercalated into the negative electrode mixture layer are separated out on the surface of the negative electrode as metal lithium or a lithium compound (hereinafter the metal lithium and the lithium compound are also collectively referred to as "lithium compound"). The lithium compound separated out on the surface of the negative electrode may reduce the battery performance.

An object of the present disclosure is to solve the above problem, i.e., to prevent the degradation in battery performance of a lithium ion secondary battery due to the separation of the lithium compound.

A lithium ion secondary battery according to an embodiment of the disclosure includes: a positive electrode mixture layer provided on a main plane of a positive electrode current collector and including a positive electrode active material intercalating or deintercalating lithium ions; a negative electrode mixture layer provided on a main plane of a negative electrode current collector and including a negative electrode active material intercalating or deintercalating lithium ions; an electrolyte layer provided between the positive electrode mixture layer and the negative electrode mixture layer; and an insulator covering a region ranging from a part of the main plane of the positive electrode current collector, the part being not provided with the positive electrode mixture layer, to a part of a surface of a gradually-decreasing portion included in the positive electrode mixture layer. The gradually-decreasing portion has thickness gradually decreasing toward a terminal of the positive electrode mixture layer; the surface of the gradually-decreasing portion has a tangent line that is in contact with the surface in at least two contact points, and has a depressed part between any adjacent two contact points on the tangent line; and an end of the insulator is positioned between the contact point that is closest to the terminal of the positive electrode mixture layer and the contact point farthest from the terminal of the positive electrode mixture layer along the tangent line.

In the lithium ion secondary battery according to the embodiment of the present disclosure, the number of contact points may be two or three.

In the lithium ion secondary battery according to the embodiment of the present disclosure, the positive electrode mixture layer, the electrolyte layer, and the negative electrode mixture layer are stacked, and the shape of the depressed part may be expressed by two connected straight lines or one arc on the cross-section of the gradually-decreasing portion including the stacking direction.

According to the embodiment of the present disclosure, the degradation in battery performance of the lithium ion secondary battery caused by the separation of the lithium compound can be prevented.

The lithium ion secondary battery according to the present disclosure will be described below in detail.

(1) Lithium Ion Secondary Battery

Figure 1:
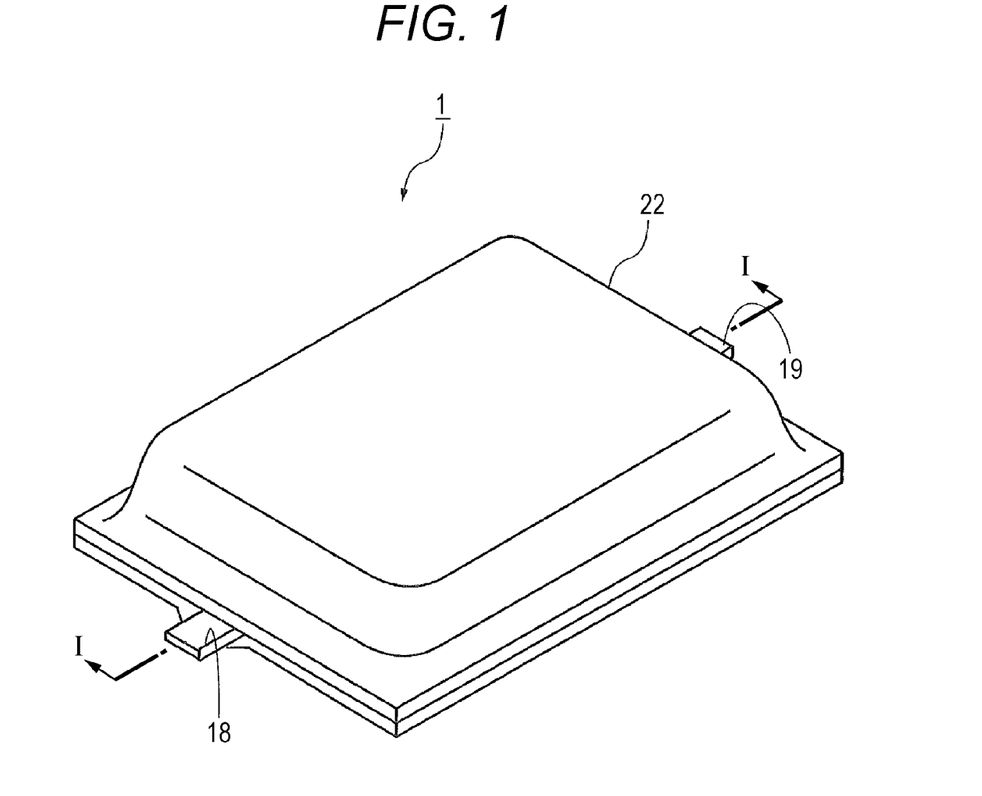
FIG. 1 is a perspective view schematically illustrating an example of a lithium ion secondary battery according to an embodiment.
Figure 2:
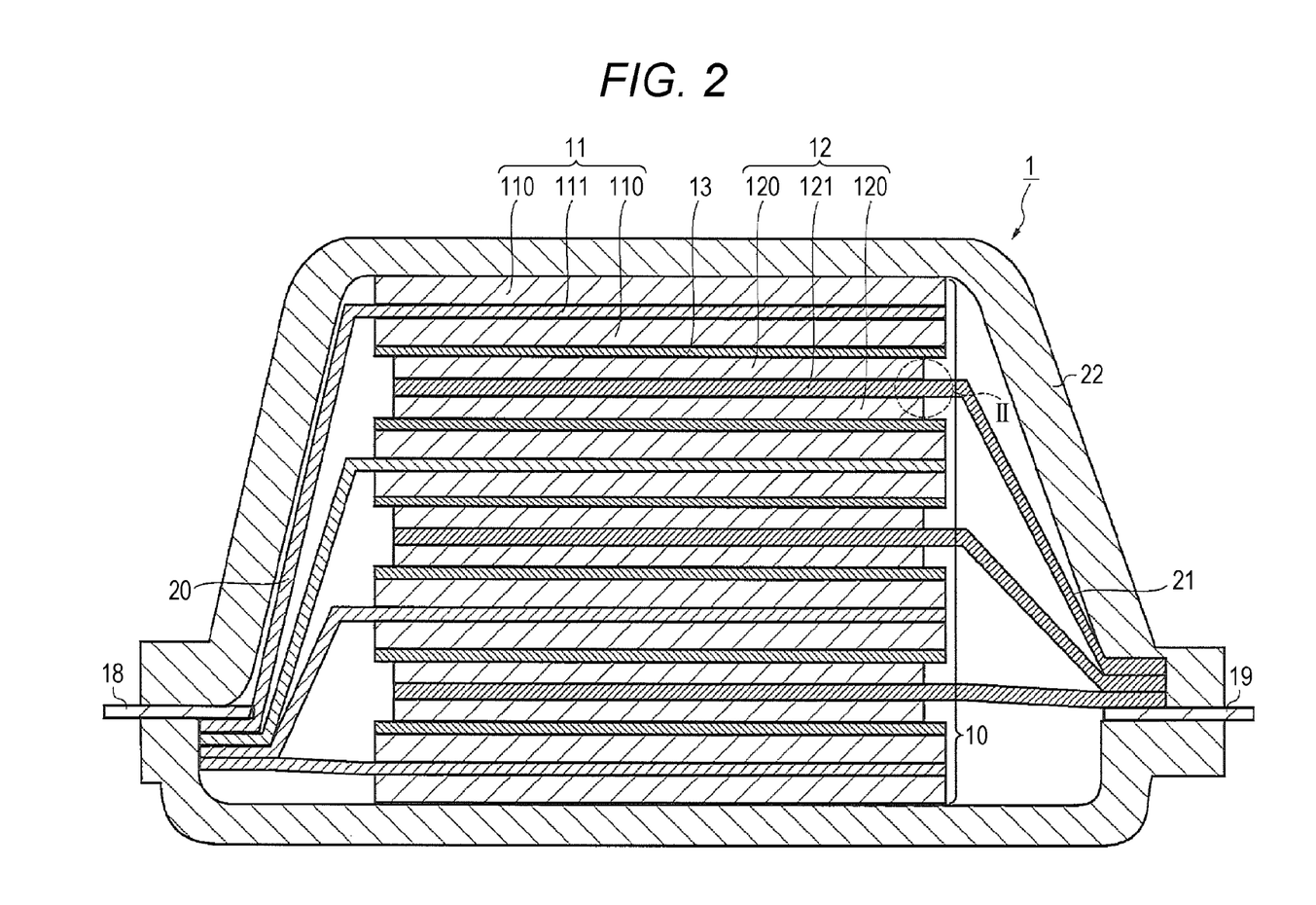
FIG. 2 is a schematic sectional view taken along line I-I of the lithium ion secondary battery illustrated in FIG. 1.

FIG. 1 is a perspective view schematically illustrating an example of a lithium ion secondary battery according to an embodiment of the present disclosure. FIG. 2 is a schematic sectional view taken along line I-I of the lithium ion secondary battery illustrated in FIG. 1. The lithium ion secondary battery of the present embodiment has a laminated film as an exterior material.

As illustrated in FIGS. 1 and 2, in the configuration of the lithium ion secondary battery 1 of the present embodiment, an approximately rectangular power generation element 10 in which the charging/discharging reaction is caused is sealed inside a laminated film 22 as an exterior material of the battery. Specifically, in the configuration of the lithium ion secondary battery, a composite laminated film including a polymer layer and a metal layer is used as the exterior material of the battery. Then, the entire exterior material around the power generation element 10 housed in the exterior material is bonded through heat-sealing, so that the power generation element 10 is sealed inside the exterior material.

The power generation element 10 is configured to have negative electrodes 11, electrolyte layers 13, and positive electrodes 12 that are stacked. The negative electrode 11 includes a negative electrode mixture layer 110 disposed on each main plane of a negative electrode current collector 111 (one surface of each of the negative electrode current collectors disposed on the bottom and top of the power generation element). The positive electrode 12 includes a positive electrode mixture layer 120 disposed on each main plane of a positive electrode current collector 121. Specifically, the negative electrode 11, the electrolyte layer 13, and the positive electrode 12 are stacked in this order so that one negative electrode mixture layer 110 is opposite to the positive electrode mixture layer 120 adjacent to the layer 110 with the electrolyte layer 13 interposed between the layer 110 and the layer 120.

Thus, the negative electrode 11, the electrolyte layer 13, and the positive electrode 12 that are adjacent to each other constitute one unit cell layer. The lithium ion secondary battery 1 of the present embodiment has the structure where a plurality of unit cell layers is stacked and is electrically connected in parallel to each other. The negative electrode is provided as the outermost layer of the power generation element 10 on both sides.

The negative electrode current collectors 111 and the positive electrode current collectors 121 are respectively provided with a negative electrode tab 18 and a positive electrode tab 19 that are electrically connected to the electrodes (negative electrode 11 and positive electrode 12). The negative electrode tab 18 and the positive electrode tab 19 are held by the ends of the laminated film 22 and led out of the laminated film 22. The negative electrode tab 18 and the positive electrode tab 19 may be respectively attached to the negative electrode current collector 111 and the positive electrode current collector 121 through a negative electrode terminal lead 20 and a positive electrode terminal lead 21 through ultrasonic welding or resistance welding, if necessary (FIG. 2 illustrates the embodiment of this case). The extended part of the negative electrode current collector 111 may be led out of the laminated film 22 and serve as the negative electrode tab 18. Similarly, the extended part of the positive electrode current collector 121 may be led out of the battery exterior material and serve as the positive electrode tab 19.

Components constituting the lithium ion secondary battery of the present embodiment will be briefly described below. These components are not limited to the components below only. The conventionally known components can be employed similarly.

(1-1) Positive Electrode or Negative Electrode (1-1-1) Current Collector

The current collector is formed of a conductive material. The current collector provided with an active material layer disposed on each surface thereof forms the electrode of the battery.

The material of the current collector is not particularly limited, and may be metal, for example. Specific examples of the metal include aluminum, nickel, iron, stainless steel, titanium, and copper. Moreover, a clad material of nickel and aluminum, a clad material of copper and aluminum, or a plated material having a combination of these metals can be used. A metal foil with a surface covered with aluminum may be used. Above all, from the viewpoint of the electron conductivity and the battery operation potential, aluminum, stainless steel, and copper may be employed.

The size of the current collector is determined in accordance with the intended purpose of the battery. For example, the large-sized battery required to have high energy density employs the current collector with a large area. The thickness of the current collector is not particularly limited, and is usually 1 to 100 µm, for example.

(1-1-2) Positive Electrode Mixture Layer

The positive electrode mixture layer includes the positive electrode active material. The positive electrode active material has a composition capable of intercalating ions in the discharging and deintercalating ions in the charging. An example of such a positive electrode active material is a lithium-transition metal composite oxide corresponding to a composite oxide of transition metal and lithium. Specific examples thereof include a Li—Co-based composite oxide such as $LiCoO_2$, a Li—Ni-based composite oxide such as $LiNiO_2$, a Li—Mn-based composite oxide with a spinel structure, such as $LiMn_2O_4$, a Li—Fe-based composite oxide such as $LiFeO_2$, and a composite oxide obtained by replacing a part of the transition metal of these composite oxides with another element. The lithium-transition metal composite oxide has excellent reactivity and cycle characteristics, and is inexpensive. Thus, the use of these materials for the electrode can produce the battery with the excellent output characteristic. Examples of the positive electrode active material include a phosphate compound and a sulfate compound including transition metal and lithium, such as $LiFePO_4$, a transition metal oxide and sulfide, such as $V_2O_5$, $MnO_2$, $TiS_2$, $MoS_2$, and $MoO_3$, and $PbO_2$, AgO, and NiOOH. Any of these positive electrode active materials may be used alone or in combination of two or more.

The average particle diameter of the positive electrode active material is not particularly limited, and may be set in the range of 1 to 100 µm, particularly 1 to 20 µm, from the viewpoint of the higher capacity, the reactivity, and the cycle durability of the positive electrode active material. When the average particle diameter is in such a range, the increase in internal resistance of the secondary battery in the charging and discharging under a high-output condition is suppressed. This enables the extraction of a sufficient amount of current. In the case where the positive electrode active material is in the form of the secondary particles, the average particle diameter of the primary particle included in the secondary particle is set in the range of 10 nm to 1 µm. In the present embodiment, however, the average particle diameter is not necessarily limited to the above range. It is needless to say that the positive electrode active material is not necessarily made into the secondary particles through the cohesion or bulking, depending on the fabrication method. The particle diameter of the positive electrode active material and the particle diameter of the primary particle may be the median size obtained by the laser diffraction method. The shape of the positive electrode active material depends on the kind of and the fabrication method for the positive electrode active material. For example, the shape may be a spherical shape (in the form of powder), a plate-like shape, a needle-like shape, a columnar shape, or a rectangular shape. The shape of the positive electrode active material, however, is not limited thereto. The positive electrode active material can have any other shape. The optimum shape for improving the battery characteristics including the charging/discharging characteristics can be selected as appropriate.

(1-1-3) Negative Electrode Mixture Layer

The negative electrode mixture layer includes a negative electrode active material. The negative electrode active material has a composition capable of deintercalating ions in the discharging and intercalating ions in the charging. The negative electrode active material is not particularly limited, and may be any material that can intercalate and deintercalate lithium ions reversibly. Examples of the negative electrode active material include metals such as Si and Sn, metal oxides such as TiO, $Ti_2O_3$, $TiO_2$, $SiO_2$, SiO, and $SnO_2$, a composite oxide of lithium and a transition metal, such as $Li_{4/3}Ti_{5/3}O_4$ and $Li_7MnN$, Li—Pb-based alloy, Li—Al-based alloy, Li, and carbon materials such as natural graphite, synthetic graphite, carbon black, activated carbon, carbon fiber, coke, soft carbon, and hard carbon. Any of these negative electrode active materials may be used alone or used in combination of two or more.

The shape and the particle diameter of the negative electrode active material are not particularly limited.

The active material layer may include another material if necessary, and may include, for example, a conductive auxiliary agent and a binder. If the active material layer includes an ion-conductive polymer, the active material layer may include a polymerization initiator for polymerizing the polymer.

The conductive auxiliary agent refers to an addition that is mixed for improving the conductivity of the active material layer. Examples of the conductive auxiliary agent include carbon powder of acetylene black, carbon black, Ketjen black, or graphite, various kinds of carbon fiber such as vapor grown carbon fiber (VGCF, registered trademark), and expanded graphite. The conductive auxiliary agent to be employed in this embodiment is not limited to those above.

Examples of the binder used in this embodiment include polyvinylidene fluoride (PVdF), polyimide, PTFE, SBR, and synthetic rubber binder. The binder to be employed in this embodiment is not limited to the above examples.

The mixing ratio of the components included in the active material layer is not particularly limited. The mixing ratio is adjusted on the basis of the public knowledge of the lithium ion secondary battery. The thickness of the active material layer is not particularly limited, and may be determined on the basis of the public knowledge of the lithium ion secondary battery. In an example, the thickness of the active material layer is set to, for example, 10 to 100 µm and particularly 20 to 50 µm. When the active material layer has a thickness of 10 µm or more, the battery can have sufficient capacity. On the other hand, when the active material layer has a thickness of 100 µm or less, it is possible to suppress the problem that the internal resistance is increased because the lithium ion is diffused less easily to the deep part of the electrode (to the current collector side).

(1-1-4) Electrolyte Layer

The electrolyte layer according to this embodiment includes the liquid electrolyte or the polymer gel electrolyte held in the separator.

(1-1-5) Separator

The separator has a function of holding the electrolyte in order to conduct lithium ions between the positive electrode and the negative electrode and a function of partitioning between the positive electrode and the negative electrode. The material of the separator used in this embodiment is not particularly limited, and may be any known material. Examples of the separator include a porous sheet separator formed of a polymer material that can absorb, hold, or carry an electrolyte (especially, electrolyte solution) and a non-woven fabric separator. Further, the separator may be formed of cellulose or ceramic.

Examples of the polymer material used for the porous sheet separator include polyolefin such as polyethylene (PE) and polypropylene (PP), polyethylene terephthalate, and polyimide. Examples of the nonwoven fabric separator include cotton, rayon, acetate, nylon, polyester, polyolefin such as polypropylene or polyethylene, polyimide, and aramid resin.

A fabrication method for the separator is not particularly limited. The separator according to the present embodiment can be fabricated with reference to the known procedure. For example, a porous sheet separator formed of a polymer material can be provided with micropores by having the polymer material stretched uniaxially or biaxially.

(1-1-6) Electrolyte

The liquid electrolyte includes a lithium salt as a supporting electrolyte dissolved in the solvent. Examples of the solvent include dimethyl carbonate (DMC), diethyl carbonate (DEC), dipropyl carbonate (DPC), ethylmethyl carbonate (EMC), methyl propionate (MP), methyl acetate (MA), methyl formate (MF), 4-methyldioxolane (4MeDOL), dioxolane (DOL), 2-methyltetrahydrofuran (2MeTHF), tetrahydrofuran (THF), dimethoxyethane (DME), ethylene carbonate (EC), propylene carbonate (PC), butylene carbonate (BC), and γ-butyrolactone (GBL). Any of these solvents may be used alone or a mixture of two or more of these solvents.

The supporting electrolyte (lithium salt) is not particularly limited. For example, the supporting electrolyte may be a salt including an anion of an inorganic acid, such as $LiPF_6$, $LiBF_4$, $LiClO_4$, $LiAsF_6$, $LiTaF_6$, $LiSbF_6$, $LiAlCl_4$, $Li_2B_{10}Cl_{10}$, LiI, LiBr, LiCl, LiAlCl, $LiHF_2$, and LiSCN, and a salt including an anion of an organic acid, such as $LiCF_3SO_3$, $Li(CF_3SO_2)_2N$, LiBOB(lithium bis(oxalate) borate), and LiBETI (lithium bis(perfluoro ethyl sulfonyl) imide, which is also expressed as $Li(C_2F_5SO_2)_2N$). Any of these electrolyte salts may be used alone or in combination of two or more of these electrolytes.

The polymer gel electrolyte is configured to include the above liquid electrolyte injected into a matrix polymer with lithium ion conductivity. Examples of the matrix polymer with the lithium ion conductivity include a polymer having polyethylene oxide in a main chain or a side chain (PEO), a polymer having polypropylene oxide in a main chain or a side chain (PPO), polyethylene glycol (PEG), polyacrylonitrile (PAN), polymethacrylate, polyvinylidene fluoride (PVdF), a copolymer of polyvinylidene fluoride and hexafluoropropylene (PVdF-HFP), poly(methylacrylate) (PMA), and poly(methylmethacrylate) (PMMA). A mixture, a modified body, a derivative, a random copolymer, an alternating copolymer, a graft copolymer, and a block copolymer of any of the above polymers can be used. In particular, PEO, PPO, a copolymer of PEO and PPO, PVdF, and PVdF-HFP can be used. Such matrix polymers allow the sufficient dissolving of the electrolyte salt such as a lithium salt. The matrix polymer can exhibit the excellent mechanical strength when having a cross-linked structure.

(1-2) Tab

As illustrated in FIGS. 1 and 2, a tab (positive electrode tab and negative electrode tab) electrically connected to the current collector is led out of the laminated film serving as the exterior body for the purpose of extracting current to the outside of the lithium ion secondary battery according to this embodiment.

The material of the tab is not particularly limited and may be any known highly conductive material that has been conventionally used as a tab for a lithium ion secondary battery. Examples of the material for the tab include a metal material such as aluminum, copper, titanium, nickel, stainless steel (SUS), and alloy thereof. Because of having the small weight, the corrosion resistance, and the high conductivity, aluminum or copper, particularly aluminum is used. The positive electrode tab and the negative electrode tab may be formed of the same material or different materials.

(1-3) Positive Electrode Terminal Lead and Negative Electrode Terminal Lead

As illustrated in FIGS. 1 and 2, the current collectors are electrically connected to the tabs through the negative electrode terminal lead 20 and the positive electrode terminal lead 21 of the lithium ion secondary battery 1. The lead may be formed by an extension part of the current collector that is not provided with the positive electrode mixture layer nor the negative electrode mixture layer.

(1-4) Exterior Material

The laminated film 22 as illustrated in FIG. 1 may be used as the exterior material, into which the power generation element 10 may be packed. The laminated film may have, for example, a three-layer structure in which polypropylene, aluminum, and nylon are stacked in this order. Alternatively, a known metal can case may be used.

(2) End Portion of Positive Electrode

Next, an end portion of the positive electrode in the sectional view of the lithium ion secondary battery according to this embodiment will be described below.

(2-1) Shape of End Portion of Positive Electrode

Figure 3:
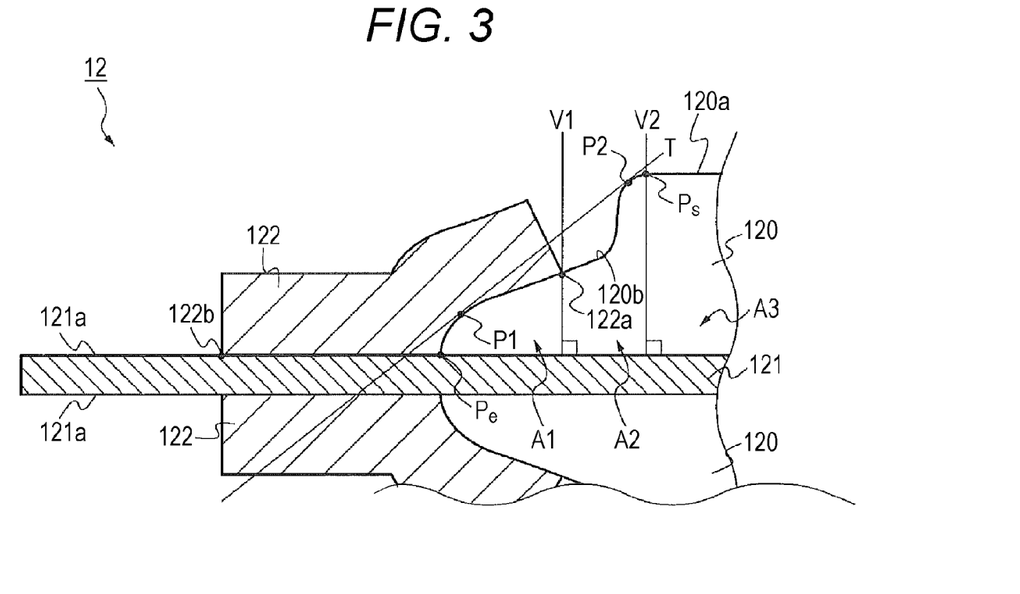
FIG. 3 is a magnified view illustrating a portion surrounded by a line II in FIG. 2.

First, the shape of the end portion of the positive electrode in this embodiment will be described with reference to FIG. 3. FIG. 3 is a magnified view illustrating the portion surrounded by a line II in FIG. 2.

As illustrated in FIG. 3, at the end portion of the positive electrode 12 in this embodiment, the positive electrode mixture layer 120 formed on each main plane 121a of the positive electrode current collector 121 includes a portion (hereinafter referred to as "gradually-decreasing portion") whose thickness gradually decreases from an upper surface 120a of the positive electrode mixture layer 120 toward the main plane 121a of the positive electrode current collector 121. The positive electrode mixture layer 120 is formed by applying a paste of a positive electrode mixture including the positive electrode active material onto the main plane 121a of the positive electrode current collector 121 with the use of a coater that discharges the paste. The sectional shape of the gradually-decreasing portion is controlled by opening and closing a valve that adjusts the amount of paste discharged from the nozzle of the coater (for example, adjusting the speed of closing the valve).

A point Ps, where the thickness of the positive electrode mixture layer 120 starts to decrease, is referred to as "gradual-decrease start point". A surface 120b of the gradually-decreasing portion of the positive electrode mixture layer 120 is referred to as "gradually-decreasing surface". An intersection Pe between the gradually-decreasing surface 120b and the main plane 121a of the positive electrode current collector 121 (i.e., the point where the thickness of the positive electrode mixture layer 120 is zero) is referred to as "gradual-decrease end point". In this embodiment, a tangent line T is formed to be in contact with the gradually-decreasing surface 120b of the positive electrode mixture layer 120 at two points. In the two contact points where the tangent line T contacts on the gradually-decreasing surface 120b, a contact point P1 closer to the main plane 121a of the positive electrode current collector 121 (i.e., closer to the gradual-decrease end point Pe) is referred to as "first contact point". In addition, a contact point P2 closer to the upper surface 120a of the positive electrode mixture layer 120 (i.e., closer to the gradual-decrease start point Ps (far from the gradual-decrease end point Pe)) is referred to as "second contact point".

As illustrated in FIG. 3, the gradual-decreasing surface 120b of the positive electrode mixture layer 120 in this embodiment has a depressed part between the first contact point P1 and the second contact point P2.

A region ranging from a part of the main plane 121a of the positive electrode current collector 121, which is not provided with the positive electrode mixture layer 120, (i.e., the part opposite to the positive electrode mixture layer 120 relative to the gradual-decrease end point Pe) to a part of the gradually-decreasing surface 120b of the positive electrode mixture layer 120 is covered with an insulator 122.

In the ends 122a and 122b of the insulator 122 covering the above region, the end 122a on the gradually-decreasing surface 120b of the positive electrode mixture layer 120 is referred to as "a first end", and the end 122b on the main plane 121a of the positive electrode current collector 121 is referred to as "a second end".

In this embodiment, the first end 122a of the insulator 122 is positioned between the first contact point P1 and the second contact point P2.

A region of the gradually-decreasing surface 120b of the positive electrode mixture layer 120, which ranges from the first end 122a of the insulator 122 to the gradual-decrease end point Pe, corresponds to a surface covered with the insulator 122 (hereinafter referred to as "covered surface"). The first contact point P1 is included in the covered surface. On the other hand, a region of the gradually-decreasing surface 120b of the positive electrode mixture layer 120, which ranges from the gradual-decrease start point Ps to the first end 122a of the insulator 122, corresponds to a surface uncovered with the insulator 122 (hereinafter referred to as "uncovered surface"). The second contact point P2 is included in the uncovered surface.

(2-2) Movement of Lithium Ions in End Portion of Positive Electrode

Next, the movement of lithium ions in the end portion of the positive electrode in this embodiment will be described below with reference to FIG. 3.

A region A1 of the positive electrode mixture layer 120, which is surrounded by a perpendicular line V1 from the contact point between the first end 122a and the gradually-decreasing surface 120b to the main plane 121a of the positive electrode current collector 121, the main plane 121a of the positive electrode current collector 121, and the gradually-decreasing surface 120b of the positive electrode mixture layer 120, is hereinafter referred to as "a first region". The first region A1 of the positive electrode mixture layer 120 corresponds to the covered surface. In other words, a part of the gradually-decreasing surface 120b of the positive electrode mixture layer 120, which corresponds to the first region A1, is covered with the insulator 122. A region A2 of the positive electrode mixture layer 120, which is surrounded by the perpendicular line V1, a perpendicular line V2 from the gradual-decrease start point Ps to the main plane 121a of the positive electrode current collector 121, the main plane 121a of the positive electrode current collector 121, and the gradually-decreasing surface 120b of the positive electrode mixture layer 120, is hereinafter referred to as "a second region." The second region A2 of the positive electrode mixture layer 120 corresponds to the uncovered surface. In other words, the part of the gradually-decreasing surface 120b of the positive electrode mixture layer 120, which corresponds to the second region A2, is not covered with the insulator 122. Moreover, a region A3 of the positive electrode mixture layer 120 between the upper surface 120a and the main plane 121a of the positive electrode mixture layer 120 is referred to as "a third region." The surface of the third region A3 of the positive electrode mixture layer 120, i.e., the upper surface 120a of the positive electrode mixture layer 120 is not covered with the insulator 122.

Each of the first region A1 to the third region A3 of the positive electrode mixture layer 120 includes the positive electrode active material whose amount is determined in accordance with the thickness of the positive electrode mixture layer 120.

On the surface of the first region A1 in the positive electrode mixture layer 120 is provided the insulator 122. Therefore, the lithium ions to be deintercalated from the positive electrode active material included in the first region do not come from the part, corresponding to the first region A1, of the gradually-decreasing surface 120b of the positive electrode mixture layer 120 (i.e., the covered surface). As a result, lithium ions move to the second region A2. On the other hand, the lithium ions to be deintercalated from the positive electrode active material included in the second region A2 in the positive electrode mixture layer 120 come from the part, corresponding to the second region A2, of the gradually-decreasing surface 120b of the positive electrode mixture layer 120 (i.e., the uncovered surface). Further, the lithium ions having moved from the first region A1 to the second region A2 are deintercalated from the part of the uncovered surface corresponding to the second region A2 in the gradually-decreasing surface 120b of the positive electrode mixture layer 120. That is to say, the part of the gradually-decreasing surface 120b of the positive electrode mixture layer 120, which corresponds to the second region A2 (i.e., the uncovered surface), not just releases the lithium ions from the positive electrode active material included in the second region A2 but also releases the lithium ions having moved from the positive electrode active material included in the first region A1.

(3) Comparative Example and Advantageous Effect of the Embodiment

Figure 4:
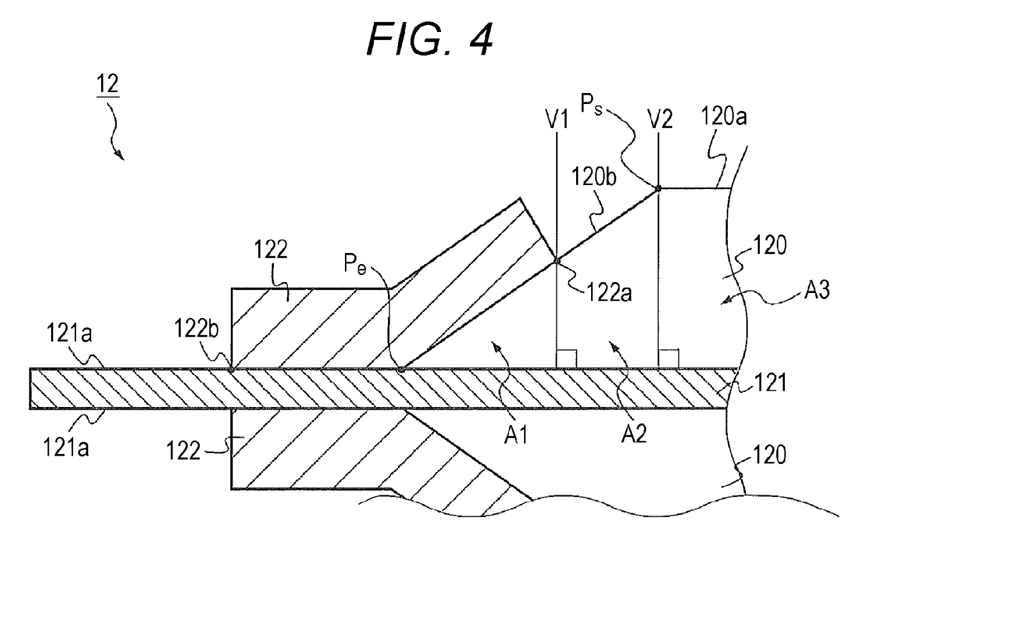
FIG. 4 is a magnified view of an end portion of a positive electrode active material layer according to a comparative example.

Next, a comparative example and the advantageous effects of the present embodiment will be described with reference to FIG. 4. FIG. 4 is a magnified view of an end portion of the positive electrode active material layer in the comparative example.

As illustrated in FIG. 4, the end portion of the positive electrode 12 in the comparative example is different from the end portion of the positive electrode 12 of the present embodiment illustrated in FIG. 3 in that the gradually-decreasing surface 120b of the positive electrode mixture layer 120 is inclined at a fixed angle (i.e., the gradually-decreasing surface 120b does not have a depressed part).

As described above, the gradually-decreasing surface 120b of the positive electrode mixture layer 120 in the comparative example does not have any depressed part. In the sectional view of the lithium ion secondary battery, the area of the first region A1 and the second region A2 in the present embodiment illustrated in FIG. 3 is smaller than the area of the first region A1 and the second region A2 in the comparative example illustrated in FIG. 4. Therefore, the amount of lithium ions deintercalated from the positive electrode active material included in the first region A1 and the second region A2 according to the present embodiment is smaller than that deintercalated from the positive electrode active material included in the first region A1 and the second region A2 in the comparative example. Thus, the amount of lithium ions deintercalated from the second region A2 in the present embodiment is smaller than that deintercalated from the second region A2 in the comparative example.

In general, the lithium ions deintercalated from the positive electrode mixture layer 120 are intercalated with the negative electrode active material included in the negative electrode mixture layer 110 opposite to the positive electrode mixture layer 120. Therefore, the upper limit of the amount of lithium ions that can be intercalated with the negative electrode active material (hereinafter referred to as "upper-limit intercalation amount") is determined based on the amount of lithium ions deintercalated from the thickest part (i.e., the upper surface 120a) of the positive electrode mixture layer 120. In the comparative example, the amount of lithium ions deintercalated from the part, corresponding to the second region A2, of the gradually-decreasing surface 120b of the positive electrode mixture layer 120 (i.e., lithium ions deintercalated from the positive electrode active material included in the first region A1 and the second region A2) may become more than the upper-limit intercalation amount of the negative electrode active material. If the amount of lithium ions deintercalated from the positive electrode mixture layer 120 is more than the upper-limit intercalation amount of the negative electrode active material, the lithium ions that are not intercalated with the negative electrode active material are more likely to turn into a lithium compound and separate out on the surface of the negative electrode. The lithium compound separated out on the surface of the negative electrode deteriorates the battery performance. In other words, in the comparative example, the performance of the lithium ion secondary battery possibly deteriorates depending on the position of the first end 122a of the insulator 122.

Differently from the comparative example illustrated in FIG. 4, the shape of the end portion of the positive electrode 12 is determined and the position of the first end 122a of the insulator 122 is set so that the amount of lithium ions deintercalated from the part, corresponding to the second region A2, of the gradually-decreasing surface 120b of the positive electrode mixture layer 120 in this embodiment is smaller than the amount of lithium ions deintercalated from the part, corresponding to the second region A2, of the gradually-decreasing surface 120b of the positive electrode mixture layer 120 in the comparative example. This can suppress the separation of the lithium compound on the surface of the negative electrode. As a result, it is possible to avoid the degradation in battery performance caused by the lithium compound separated out on the surface of the negative electrode 11. In particular, the amount of lithium ions deintercalated from the second region A2 can be reduced while a predetermined overlapping width between the insulator 122 and the positive electrode mixture layer 120 is maintained. This can enlarge the region with the insulating property.

(4) Modified Examples of the Embodiment

Modified examples of this embodiment will be described below with reference to FIGS. 5 to 8. The operation of lithium ions in the end portion of the positive electrode in the modified examples of the present embodiment is the same as that in the present embodiment, and therefore the description thereof is omitted.

(4-1) First Modified Example of the Embodiment

Figure 5:
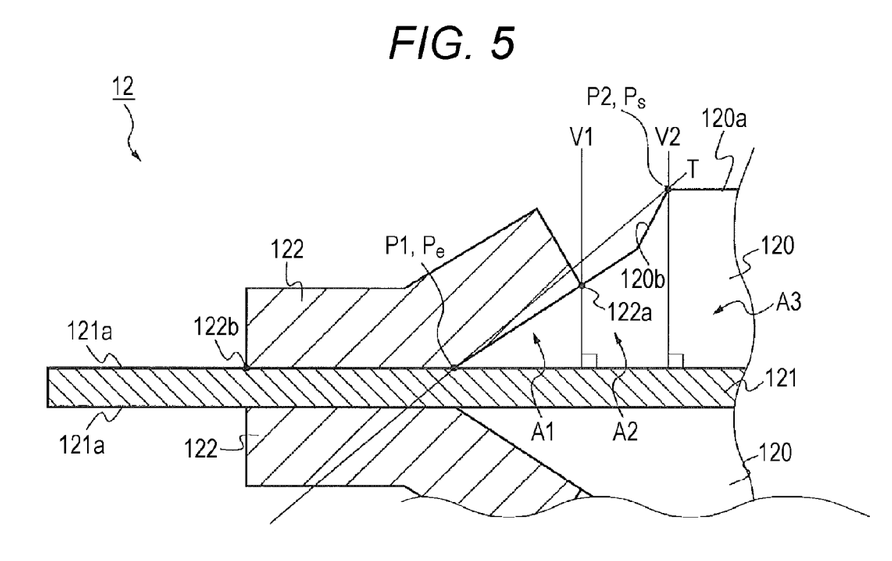
FIG. 5 is a magnified view of a portion of FIG. 2 surrounded by the line II in a first modified example of the embodiment.

The shape of the end portion of the positive electrode according to the first modified example of this embodiment will be described below with reference to FIG. 5. FIG. 5 is a magnified view of a portion of FIG. 2 surrounded by the line II in the first modified example of this embodiment.

As illustrated in FIG. 5, the end portion of the positive electrode 12 of the first modified example of this embodiment is different from that of this embodiment (FIG. 3) in the following points:
the gradual-decrease end point Pe coincides with the first contact point P1;
the gradual-decrease start point Ps coincides with the second contact point P2; and
the gradually-decreasing surface 120b of the positive electrode mixture layer 120 is expressed by two connected lines in the sectional view.

(4-2) Second Modified Example of the Embodiment

Figure 6:
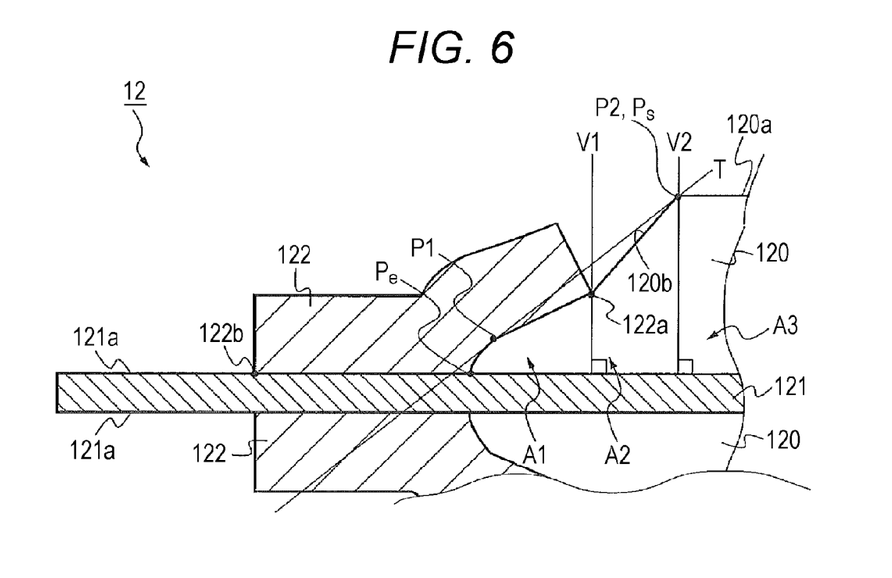
FIG. 6 is a magnified view of a portion of FIG. 2 surrounded by the line II in a second modified example of the embodiment.

The shape of the end portion of the positive electrode according to the second modified example of this embodiment will be described below with reference to FIG. 6. FIG. 6 is a magnified view of the portion of FIG. 2 surrounded by the line II in the second modified example of this embodiment.

As illustrated in FIG. 6, the end portion of the positive electrode 12 of the second modified example of this embodiment is different from that of this embodiment (FIG. 3) in the following points:
the gradual-decrease start point Ps coincides with the second contact point P2; and
the gradually-decreasing surface 120b of the positive electrode mixture layer 120 is expressed by two connected lines in the sectional view.

(4-3) Third Modified Example of the Embodiment

Figure 7:
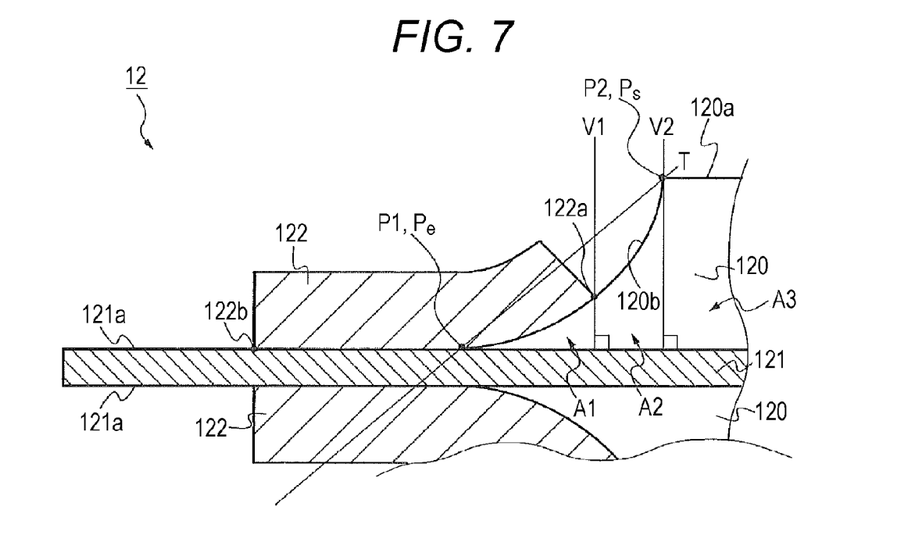
FIG. 7 is a magnified view of a portion of FIG. 2 surrounded by the line II in a third modified example of the embodiment.

The shape of the end portion of the positive electrode according to the third modified example of this embodiment will be described below with reference to FIG. 7. FIG. 7 is a magnified view of the portion of FIG. 2 surrounded by the line II in the third modified example of this embodiment.

As illustrated in FIG. 7, the end portion of the positive electrode 12 of the third modified example of this embodiment is different from that of this embodiment (FIG. 3) in the following points:
the gradual-decrease end point Pe coincides with the first contact point P1;
the gradual-decrease start point Ps coincides with the second contact point P2; and the gradually-decreasing surface 120b of the positive electrode mixture layer 120 is expressed by an arc in the sectional view.

(4-4) Fourth Modified Example of the Embodiment

Figure 8:
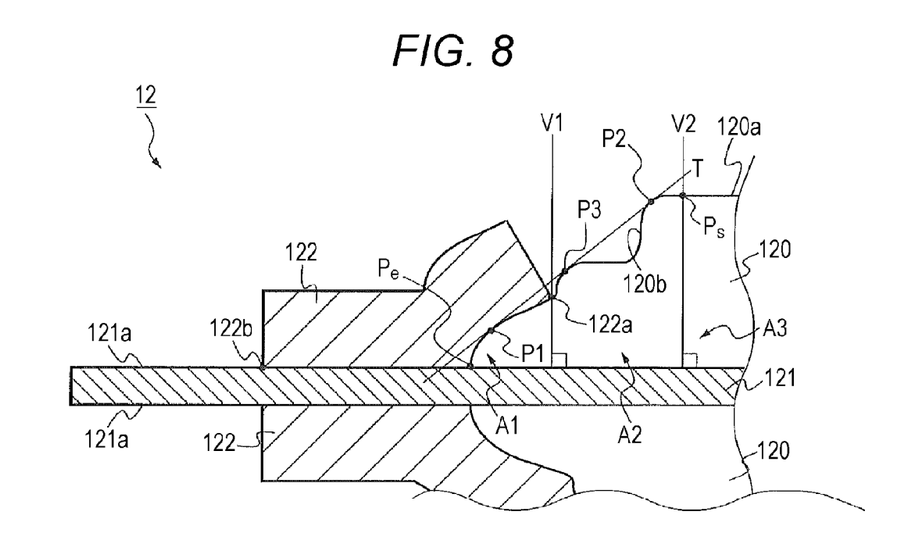
FIG. 8 is a magnified view of a portion of FIG. 2 surrounded by the line II in a fourth modified example of the embodiment.

The shape of the end portion of the positive electrode according to the fourth modified example of this embodiment will be described below with reference to FIG. 8. FIG. 8 is a magnified view of the portion of FIG. 2 surrounded by the line II in the fourth modified example of this embodiment.

As illustrated in FIG. 8, the end portion of the positive electrode 12 of the fourth modified example of this embodiment is different from that of this embodiment (FIG. 3) in the following points:

a third contact point P3 in contact with the tangent line T exists between the first contact point P1 and the second contact point P2; and the gradually-decreasing surface 120b of the positive electrode mixture layer 120 has the depressed part between the first contact point P1 and the third contact point P3 and between the second contact point P2 and the third contact point P3.

In any of the first to fourth modified examples in this embodiment, the shape of the end portion of the positive electrode 12 is determined and the position of the first end 122a of the insulator 122 is set so that the amount of lithium ions deintercalated from the part, corresponding to the second region A2, of the gradually-decreasing surface 120b of the positive electrode mixture layer 120 is smaller than the amount of lithium ions deintercalated from the part, corresponding to the second region A2, of the gradually-decreasing surface 120b of the positive electrode mixture layer 120 in the comparative example in FIG. 4. As a result, it is possible to avoid the degradation in battery performance caused by the lithium compound separated out on the surface of the negative electrode 11, similarly to the present embodiment.

(5) Summary of the Embodiment

The summary of this embodiment will be described below.

The lithium ion secondary battery according to this embodiment includes the positive electrode mixture layer 120, the negative electrode mixture layer 110, the electrolyte layer 13, and the insulator 122. The positive electrode mixture layer 120 is provided on the main plane 121a of the positive electrode current collector 121, and includes the positive electrode active material intercalating or deintercalating lithium ions. The negative electrode mixture layer 110 is provided on the main plane of the negative electrode current collector 111, and includes the negative electrode active material intercalating or deintercalating lithium ions. The electrolyte layer 13 is provided between the positive electrode mixture layer 120 and the negative electrode mixture layer 110. The insulator 122 covers the region ranging from the part of the main plane 121a of the positive electrode current collector 121 that is not provided with the positive electrode mixture layer 120 to the part of the surface of the gradually-decreasing portion included in the positive electrode mixture layer 120 and having the decreasing thickness. The surface of the gradually-decreasing portion of the positive electrode mixture layer 120 has the tangent line T in contact with the surface in at least the two contact points P1 and P2. The surface of the gradually-decreasing portion has the depressed part between the contact points P1 and P2 that are adjacent on the tangent line T. The end 122a of the insulator 122 is positioned between the contact point P1 closest to the main plane 121a of the positive electrode current collector 121 and the contact point P2 farthest from the main plane 121a of the positive electrode current collector 121.

According to this embodiment, the degradation in battery performance of the lithium ion secondary battery caused by the separation of the lithium compound can be prevented.

The embodiment of the present disclosure has been described above. However, the above embodiment merely describes an example of the embodiment according to the present disclosure. The gist of the embodiment is not to limit the disclosed technical range to the lithium ion secondary battery with the specific structure described in the above embodiment. For example, the present disclosure can be applied to a bipolar battery in which the current collectors each having the positive electrode active material layer formed on one surface and the negative electrode active material layer formed on the other surface that are alternately stacked with the electrolyte layer interposed therebetween.

The first end 122a of the insulator 122 may be provided above the center of the gradually-decreasing portion. In this case, the amount of lithium ions deintercalated from the portion corresponding to the covered surface covered with the insulator 122 is smaller than the conventional amount because the end portion of the positive electrode 12 is depressed. In other words, while the predetermined overlapping width between the insulator 122 and the positive electrode mixture layer 120 is maintained, the amount of lithium ions deintercalated from the portion corresponding to the covered surface covered with the insulator 122 can be reduced. This can enlarge the region with the insulating property.

The lithium ion secondary battery according to the embodiment of the present disclosure includes: the positive electrode mixture layer provided on the main plane of the positive electrode current collector and including the positive electrode active material intercalating or deintercalating lithium ions; the negative electrode mixture layer provided on the main plane of the negative electrode current collector and including the negative electrode active material intercalating or deintercalating lithium ions; the electrolyte layer provided between the positive electrode mixture layer and the negative electrode mixture layer; and the insulator covering the region ranging from the part of the main plane of the positive electrode current collector that is not provided with the positive electrode mixture layer to the part of the surface of the gradually-decreasing portion where the thickness of the positive electrode mixture layer gradually decreases, wherein: the surface of the gradually-decreasing portion of the positive electrode mixture layer has a depressed shape between at least two contact points that are in contact with a tangent line on the surface of the gradually-decreasing portion, and an end of the insulator is positioned between the two contact points.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A lithium ion secondary battery comprising:
a positive electrode mixture layer provided on a main plane of a positive electrode current collector and including a positive electrode active material intercalating or deintercalating lithium ions;
a negative electrode mixture layer provided on a main plane of a negative electrode current collector and including a negative electrode active material intercalating or deintercalating lithium ions;
an electrolyte layer provided between the positive electrode mixture layer and the negative electrode mixture layer; and
an insulator covering a region ranging from a part of the main plane of the positive electrode current collector, the part being not provided with the positive electrode mixture layer, to a part of a surface of a sloped portion included in the positive electrode mixture layer, wherein
the sloped portion has thickness sloped toward a terminal of the positive electrode mixture layer,
the surface of the sloped portion comprises at least two slopes which are not parallel or perpendicular to the main plain of the positive electrode current collector and a tangent line that is in contact with the surface in at least two contact points, and the at least two slopes comprise a depressed part between two adjacent contact points on the tangent line, and
an end of the insulator is positioned between the contact point that is closest to the terminal of the positive electrode mixture layer and the contact point farthest from the terminal of the positive electrode mixture layer along the tangent line.

2. The lithium ion secondary battery according to claim 1, wherein the number of contact points is two.

3. The lithium ion secondary battery according to claim 1, wherein the number of contact points is three.

4. The lithium ion secondary battery according to claim 1, wherein
the positive electrode mixture layer, the electrolyte layer, and the negative electrode mixture layer are stacked, and
the depressed part has a shape expressed by two connected straight lines in a section of the sloped portion which are between the tangent line and the main plane of the positive electrode current collector.

5. The lithium ion secondary battery according to claim 2, wherein
the positive electrode mixture layer, the electrolyte layer, and the negative electrode mixture layer are stacked, and
the depressed part has a shape expressed by two connected straight lines in a section of the sloped portion which are between the tangent line and the main plane of the positive electrode current collector.

6. The lithium ion secondary battery according to claim 3, wherein
the positive electrode mixture layer, the electrolyte layer, and the negative electrode mixture layer are stacked, and
the depressed part has a shape expressed by two connected straight lines in a section of the sloped portion which are between the tangent line and the main plane of the positive electrode current collector.

7. The lithium ion secondary battery according to claim 1, wherein
the positive electrode mixture layer, the electrolyte layer, and the negative electrode mixture layer are stacked, and
the depressed part has a shape expressed by one arc in a section of the sloped portion between the tangent line and the main plane of the positive electrode current collector.

8. The lithium ion secondary battery according to claim 2, wherein
the positive electrode mixture layer, the electrolyte layer, and the negative electrode mixture layer are stacked, and
the depressed part has a shape expressed by one arc in a section of the sloped portion between the tangent line and the main plane of the positive electrode current collector.

9. The lithium ion secondary battery according to claim 3, wherein
the positive electrode mixture layer, the electrolyte layer, and the negative electrode mixture layer are stacked, and
the depressed part has a shape expressed by one arc in a section of the sloped portion between the tangent line and the main plane of the positive electrode current collector.

* * * * *